(12) United States Patent
Kim et al.

(10) Patent No.: US 7,161,729 B2
(45) Date of Patent: **\*Jan. 9, 2007**

(54) ARRAY OF MICROMIRROR ARRAY LENSES

(75) Inventors: Tae Hyeon Kim, Taejeon (KR); Sang Hyune Baek, Suwon (KR)

(73) Assignees: Angstrom Inc., Suwon (KR); Stereo Display Inc., Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/857,714

(22) Filed: May 28, 2004

(65) Prior Publication Data

US 2005/0275929 A1    Dec. 15, 2005

(51) Int. Cl.
*G02B 26/00* (2006.01)
*G02B 26/08* (2006.01)
*G02B 5/08* (2006.01)
*G02B 5/10* (2006.01)
*G02B 7/182* (2006.01)

(52) U.S. Cl. ............... 359/291; 359/295; 359/298; 359/302; 359/846; 359/849; 359/853; 359/871

(58) Field of Classification Search ............... 359/846, 359/290–292, 295, 298, 302, 721, 724, 726, 359/727, 741, 742, 743, 619–621, 625, 626, 359/628, 627, 849–851, 853, 865, 871–877
See application file for complete search history.

(56) References Cited

U.S. PATENT DOCUMENTS

| | | | |
|---|---|---|---|
| 2,002,376 A | | 5/1935 | Manfred |
| 4,834,512 A | | 5/1989 | Austin |
| 5,004,319 A | * | 4/1991 | Smither ...................... 359/570 |
| 5,986,811 A | | 11/1999 | Wohlstadter |
| 6,111,900 A | | 8/2000 | Suzudo |
| 6,549,730 B1 | * | 4/2003 | Hamada ...................... 359/290 |
| 6,658,208 B1 | | 12/2003 | Watanabe et al. |
| 6,784,771 B1 | * | 8/2004 | Fan ............................. 335/78 |
| 6,833,938 B1 | | 12/2004 | Nishioka |
| 6,900,922 B1 | * | 5/2005 | Aubuchon .................. 359/292 |
| 6,906,848 B1 | * | 6/2005 | Aubuchon .................. 359/291 |
| 6,934,073 B1 | * | 8/2005 | Kim et al. .................. 359/291 |
| 6,970,284 B1 | * | 11/2005 | Kim et al. .................. 359/291 |
| 6,999,226 B1 | * | 2/2006 | Kim et al. .................. 359/291 |
| 2002/0102102 A1 | | 8/2002 | Watanabe et al. |

(Continued)

OTHER PUBLICATIONS

Kaneko et al., 2000, "Quick Response Dynamic Focusing Lens using Multi-Layered Piezoelectric Bimorph Actuator," Proceeding of SPIE vol. 4075: 24-31.

(Continued)

*Primary Examiner*—Evelyn A. Lester
(74) *Attorney, Agent, or Firm*—John K. Park; Park Law Firm

(57) ABSTRACT

An array of micromirror array lenses is invented. The micromirror array lens consists of many micromirrors and actuating components. Each micromirror array lens is variable focal length lens with high speed focal length change. The lens can have arbitrary type and/or size as desired and desired arbitrary optical axis and can correct aberration by controlling each micromirror independently. Independent control of each micromirror is possible by known microelectronics technologies. The actuating components control the positions of micromirrors electrostatically and/or electromagnetically. The optical efficiency of the micromirror array lens is increased by locating a mechanical structure upholding micromirrors and the actuating components under micromirrors. The known microelectronics technologies remove the loss in effective reflective area due to electrode pads and wires.

33 Claims, 8 Drawing Sheets

U.S. PATENT DOCUMENTS

2003/0058520 A1*  3/2003  Yu et al. .................... 359/291
2005/0057812 A1   3/2005  Raber
2005/0225884 A1* 10/2005  Gim et al. ................. 359/851
2005/0264867 A1* 12/2005  Cho et al. .................. 359/291
2005/0264870 A1* 12/2005  Kim et al. ................. 359/298
2006/0012852 A1*  1/2006  Cho et al. .................. 359/291
2006/0028709 A1*  2/2006  Cho et al. .................. 359/291

OTHER PUBLICATIONS

Cho, 2003, "Fast-response Variable Focusing Micromirror Array Lens," Proceeding of SPIE vol. 5055: 278-286.

* cited by examiner

ARRAY OF MICROMIRROR ARRAY LENSES

BACKGROUND OF THE INVENTION

The present invention relates to an array of micromirror array lenses and operational methods for the lens.

A most widely used conventional variable focal length system is the one using two refractive lenses. It has complex driving mechanisms to control the relative positions of refractive lenses and a slow response time. Alternatively, variable focal length lenses have been made. Variable focal length lenses can be made by changing the shape of the lens, as is found in the human eye; this method has been used in lenses made with isotropic liquids. Other lenses have been made of electrically variable refractive index media to create either a conventional lens or a gradient index lens by means of a voltage gradient. The electrically variable refractive index allows the focal length of the lenses to be voltage controlled. Among them, the most advanced variable focal length lens is a liquid crystal variable focal length lens, which has a complex mechanism to control the focal length. Its focal length is changed by modulating the refractive index. Unfortunately, it has a slow response time typically on the order of hundreds of milliseconds. Even though the fastest response liquid crystal lens has the response time of tens of milliseconds, it has small focal length variation and low focusing efficiency.

To solve the disadvantages of the conventional focal length lens, a fast-response micromirror array lens was proposed. The details of the fast-response micromirror array lens are described in J. Boyd and G. Cho, 2003, "Fast-response Variable Focusing Micromirror Array Lens," *Proceeding of SPIE* Vol. 5055: 278–286. The paper is incorporated by reference into this disclosure as if fully set forth herein. The micromirror array lens mainly consists of micromirrors and actuating components, and uses a much simpler mechanism to control the focusing system than a liquid crystal variable focal length lens. The focal length of the micromirror array lens is varied with the displacement of each micromirror. But, the paper only describes a single micromirror array lens and basic idea related to design and control. This invention provides an array of the micromirror array lens and improves the design and control of the micromirror array lens. It extends advantages and applications of a conventional lens array.

SUMMARY OF THE INVENTION

The present invention contrives to solve the disadvantages of an array comprising the conventional variable focal length lens.

The objective of the invention is to provide the array comprising variable focal length lenses with high-speed focal length change.

Another objective of the invention is to provide the array comprising variable focal length lenses with a function of aberration correction.

Still another objective of the invention is to provide the array comprising variable focal length lenses with variable optical axis.

Still another objective of the invention is to provide the array comprising variable focal length lenses with arbitrary size and/or type. It extends advantages and applications of a conventional lens array.

The invention consists of many micromirror array lenses, which consists of many micromirrors to reflect the light and actuating components to control positions of the micromirrors.

Each micromirror has the same function as a mirror. Therefore, the reflective surface of the micromirror is made of metal, metal compound, or other materials that have high reflectivity. Many known microfabrication processes can make the surface of the micromirror to have high reflectivity. By making all light scattered from one point of an object have the same periodical phase and converge at one point of image plane, the micromirror array works as a reflective focal length lens. In order to do this, the micromirrors are electrostatically and/or electromagnetically controlled to have desired positions by actuating components. The focal length of the lens is changed by controlling translation, by controlling rotation, or by controlling both translation and rotation of each micromirror. The micromirror array lens formed by the control of only rotation has relatively larger aberration than the lens with both translation and rotation since the phase is not controlled by translation. The micromirror array lens formed by the control of only translation also has relatively larger aberration. For the micromirror array lens with pure translation, the smaller the sizes of the micromirrors are, the less is the aberration. Even though the quality of the lens formed by control of either only translation or only rotation is lower than the lens formed by control of both rotation and translation, it can be used as a low quality lens because its structure and control is much simpler than the lens formed by control of both rotation and translation.

The micromirror array lens can be formed by a polar array of the micromirrors. For the polar array, each micromirror has a fan shape to increase an effective reflective area, so that the optical efficiency increases. The aberration of the micromirror array lens can be reduced by micromirrors with curvatures. The optical efficiency of the micromirror array lens can be improved by locating a mechanical structure upholding micromirrors and the actuating components under micromirrors to increase an effective reflective area. Electric circuits to operate the micromirrors can be replaced with known microelectronics such as MOS or CMOS. Applying the microelectronics circuits under micromirror array, the effective reflective area can be increased by removing necessary area for electrode pads and wires. The lens can correct aberration, which is caused by optical effects due to the medium between the object and its image or is caused by defects of a lens system that cause its image to deviate from the rules of paraxial imagery, by controlling each micromirror independently. Independent control of each micromirror is also possible by replacing electric circuits required for control with known microelectronics technologies and fabricating the ciruits underneath the micromirrors using known microfabrication methods.

The array comprising micromirrors with two degree of freedom rotations or two degree of freedom rotations and one degree of freedom translation which are controlled independently can make a lens with arbitrary shape and/or size as desired, or a lens array comprising lenses with arbitrary shape and/or size, as desired. Incident lights can be modulated arbitrarily by forming desired arbitrary shape and/or size of a lens, or a lens array comprising lenses with arbitrary shape and/or size. To do this, it is required that incident lights are deflected to arbitrary directions by controls of two degree of freedom rotations or controls of two degree of freedom rotations and one degree of freedom translation. Independent translation of each micromirror is also required to satisfy the phase condition.

To achieve the above objective, the present invention specifically provides a variable focal length lens array comprising a plurality of lenses, in which each of the lenses comprises a plurality of micromirrors.

In the lens array, the translation and/or the rotation of the micromirrors is controlled.

In the lens array two degree of freedom rotations of the micromirrors are controlled.

Alternatively, two degree of freedom rotations and one degree of freedom translation of the micromirrors are controlled.

The micromirrors of the lens array are controlled independently.

Control circuitry is constructed under the micromirrors by using microelectronics fabrication technologies.

The reflective surface of the micromirror is substantially flat.

Alternatively, the reflective surface of the micromirror has a curvature. The curvatures of the micromirrors are controlled. The curvatures of the micromirrors are controlled by electrothermal force or electrostatic force.

The micromirror may have a fan shape, a hexagonal shape, a rectangular shape, a square shape, and a triangle shape etc.

The micromirrors are controlled to change the focal length of each lens of the lens array.

All of the micromirrors are arranged in a flat plane.

The micromirrors are arranged to form one or more concentric circles to form a lens.

The micromirrors on each of the concentric circles are controlled by one or more electrodes corresponding to the concentric circle.

The micromirrors are actuated by electrostatic force and/or electromagnetic force.

The surface material of the micromirror is the one with high reflectivity including metal.

A mechanical structure upholding the micromirrors and actuating components are located under the micromirrors.

The lens is an adaptive optical component. Therefore the lens compensates for phase errors of light due to the medium between an object and its image; corrects aberrations; corrects the defects of an imaging system that cause the image to deviate from the rules of paraxial imagery. Also an object which does not lie on the optical axis can be imaged by the lens without macroscopic mechanical movement.

The lens is controlled to satisfy the same phase condition for each wavelength of Red, Green, and Blue (RGB), respectively, to get a color image.

Alternatively, the lens is controlled to satisfy the same phase condition for one wavelength among Red, Green, and Blue (RGB) to get a color image.

Alternatively, the same phase condition for color imaging is satisfied by using the least common multiple of wavelengths of Red, Green, and Blue lights as an effective wavelength for the phase condition.

In one embodiment, the micromirror is not controlled to satisfy the same phase condition for color imaging.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with references to the accompanying drawings, wherein.

DETAILED DESCRIPTION OF THE INVENTION

Figure 1:
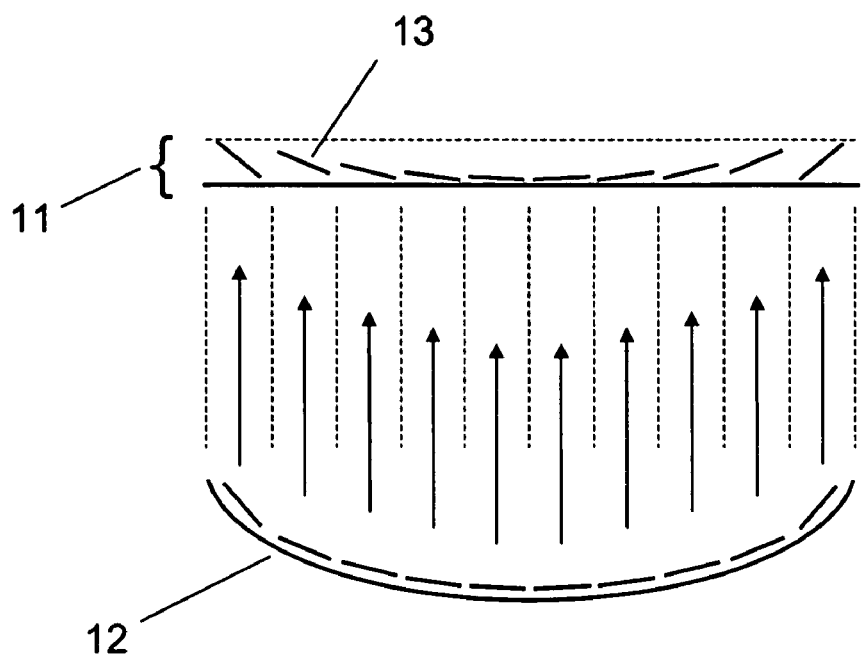
FIG. 1 is a schematic diagram showing the cut-away side view of a micromirror array lens.

FIG. 1 illustrates the principle of the micromirror array lens 11. There are two conditions to make a perfect lens. The first is the converging condition that all light scattered by one point of an object should converge into one point of the image plane. The second is the same phase condition that all converging light should have the same phase at the image plane. To satisfy the perfect lens conditions, the surface shape of conventional reflective lens 12 is formed to have all light scattered by one point of an objective to be converged into one point of the image plane and have the optical path length of all converging light to be same.

A micromirror array arranged in flat plane can satisfy two conditions to be a lens. Each of the micromirrors 13 rotates to converge the scattered light. Because all micromirrors 13 of the micromirror array lens 11 are arranged in a flat plane as shown in FIG. 1, the optical path length of lights converged by rotation of the micromirrors is different. Even though the optical path length of converging light is different, the same phase condition can be satisfied by adjusting the phase because the phase of light is periodic.

Figure 2:
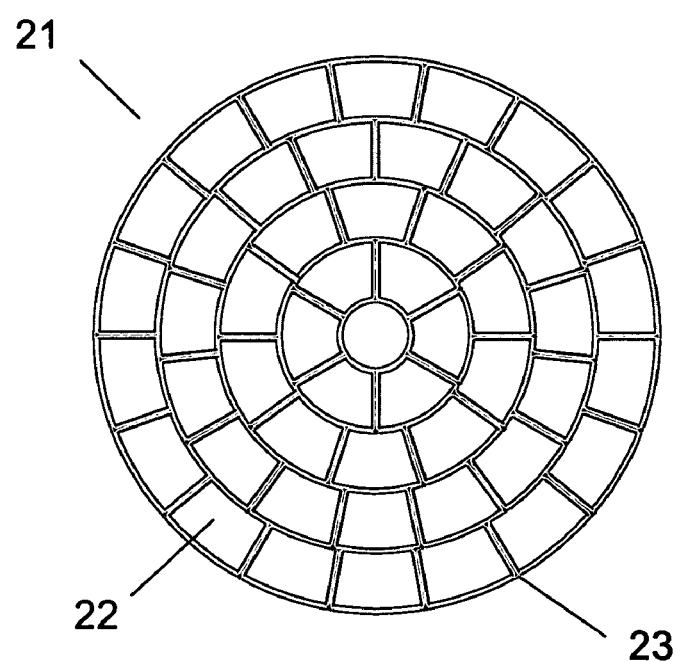
FIG. 2 is an in-plane schematic view showing one of the structures of the micromirror array lens that is made of many micromirrors and actuating components.

FIG. 2 illustrates the in-plane view of the micromirror array lens 21. The micromirror 22 has the same function as a mirror. Therefore, the reflective surface of the micromirror 22 is made of metal, metal compound, or other materials with reflectivity. Many known microfabrication processes can make the surface have high reflectivity. Each micromirror 22 is electrostatically and/or electromagnetically controlled by the actuating components 23 as known. In case of an axisymmetric lens, the micromirror array lens 21 has a polar array of the micromirrors 22. Each of the micromirrors 22 has a fan shape to increase an effective reflective area, which increases optical efficiency. The micromirrors are arranged to form one or more concentric circles to form the axisymmetric lens and the micromirrors on same concentric circle can be controlled by the same electrodes with concentric circle shape.

The mechanical structure upholding each reflective micromirror 22 and the actuating components 23 are located under the micromirrors 22 to increase the effective reflective area. Also, electric circuits to operate the micromirrors can be replaced with known microelectronics technologies such as MOS or CMOS. Applying the circuits under micromirror array, the effective reflective area can be increased by removing necessary area for electrode pads and wires used to supply actuating power.

Figure 3:
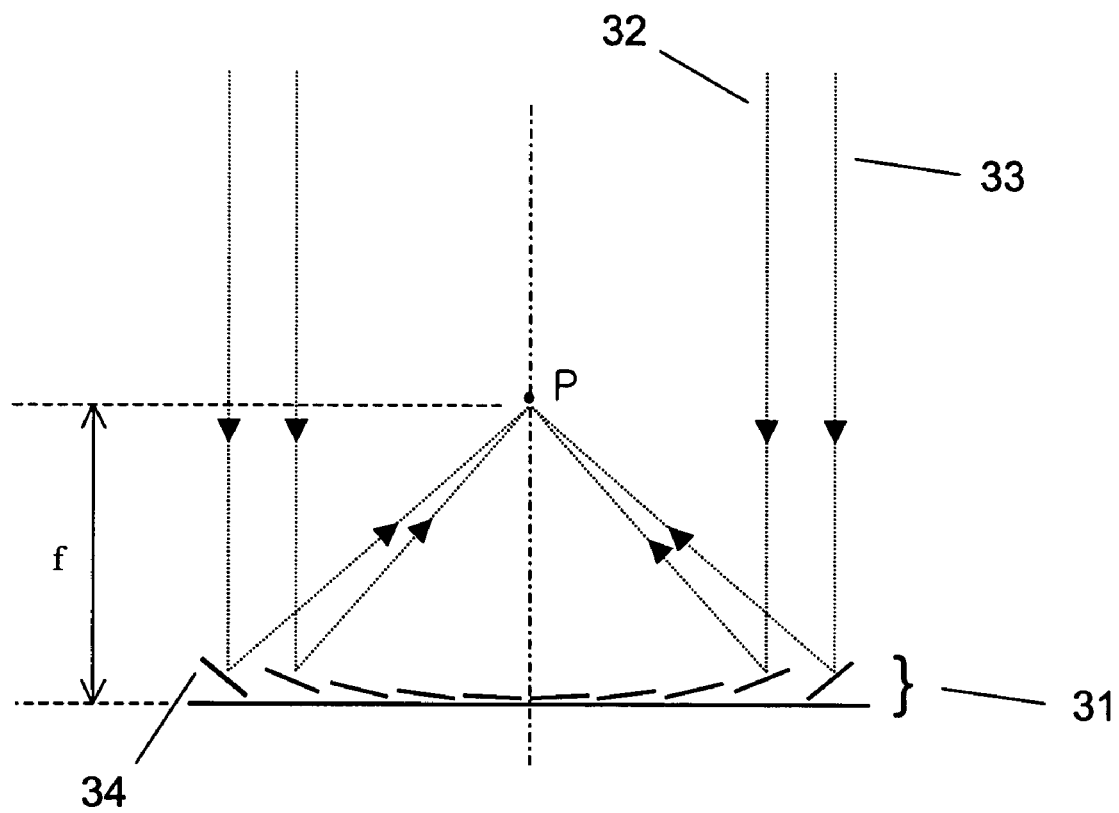
FIG. 3 is a schematic diagram showing how a micromirror array lens works as a lens.

FIG. 3 illustrates how the micromirror array lens 31 images. Arbitrary scattered lights 32, 33 are converged into one point P of the image plane by controlling the positions of the micromirrors 34. The phases of arbitrary light 32, 33 can be adjusted to be same by translating the micromirrors 34. The required translational displacement is at least half of the wavelength of light.

It is desired that each of the micromirrors 34 has a curvature because the ideal shape of a conventional reflective lens 12 has a curvature. If the size of the flat micromirror is small enough, the aberration of the lens comprising flat micromirrors 34 is also small enough. In this case, the micromirror does not need a curvature.

The focal length f of the micromirror array lens 31 is changed by controlling the rotation and/or translation of each micromirror 34. The micromirror array lens 31 is possible by controlling only rotation without controlling translation even though it has relatively a large aberration. In this case, the imaging quality of the lens 31 formed by controlling only rotation is degraded due to the aberration.

Figure 4:
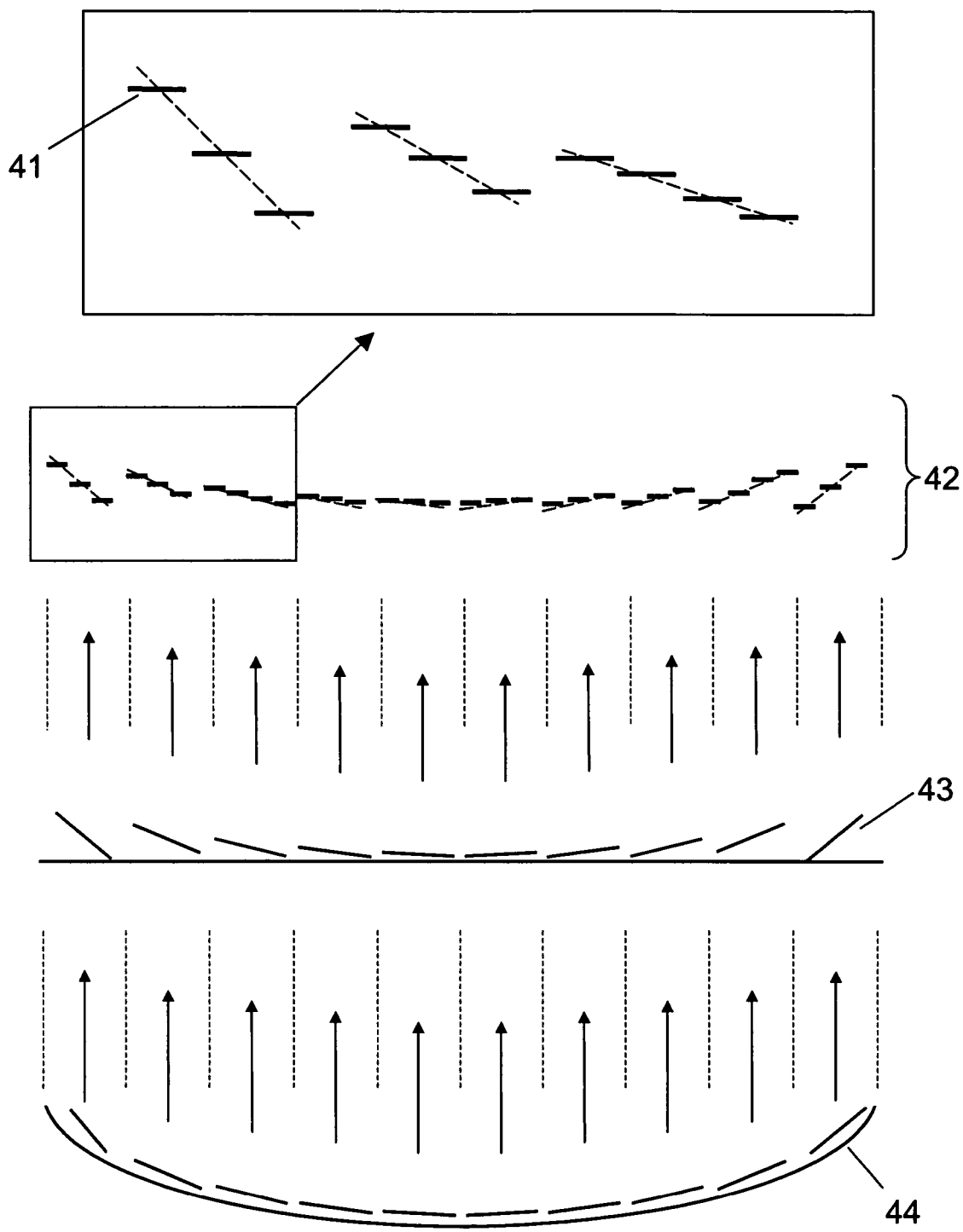
FIG. 4 is a schematic diagram showing the cut-away side view of the micromirror array lens with pure translation.

FIG. 4 illustrates the micromirror array lens 42 made by pure translation without rotation of micromirror 41. As explained at FIG. 1, a conventional reflective lens 44 can be replaced by control of rotation and translation of micromirrors 43. Pure translation without rotation can also satisfy the two imaging conditions by Fresnel diffraction theory. The lens 42 formed by the control of only translation has also the aberration. The smaller the sizes of the micromirrors 41 are, the less is the aberration. Even though the lens with either translation 42 or rotation has low quality, it can be used as a lens because its structure and control are much simpler than the lens with both rotation and translation.

Figure 5:
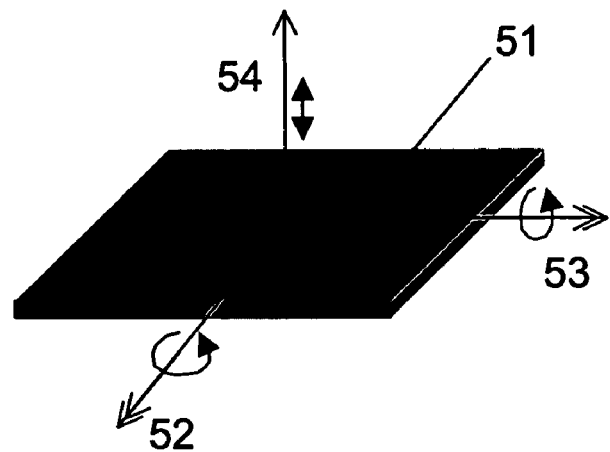
FIG. 5 is a schematic diagram showing two rotational axes and one translational axis of the micromirror.

FIG. 5 shows two degree of freedom rotations and one degree of freedom translation of the micromirror 51. The array comprising micromirrors 51 with two degree of freedom rotations 52, 53 or two degree of freedom rotations 52, 53 and one degree of freedom translation 54 which are controlled independently can make a lens with arbitrary shape and/or size, or a lens array comprising lenses with arbitrary shape and/or size. Incident lights can be modulated arbitrarily by forming an arbitrary shape and/or size lens or a lens array comprising lenses with arbitrary shape and/or size. To do this, it is required that incident lights are deflected to arbitrary directions by controls of two degree of freedom rotations 52, 53. Independent translation 54 of each micromirror is also required to satisfy the phase condition.

Figure 6:
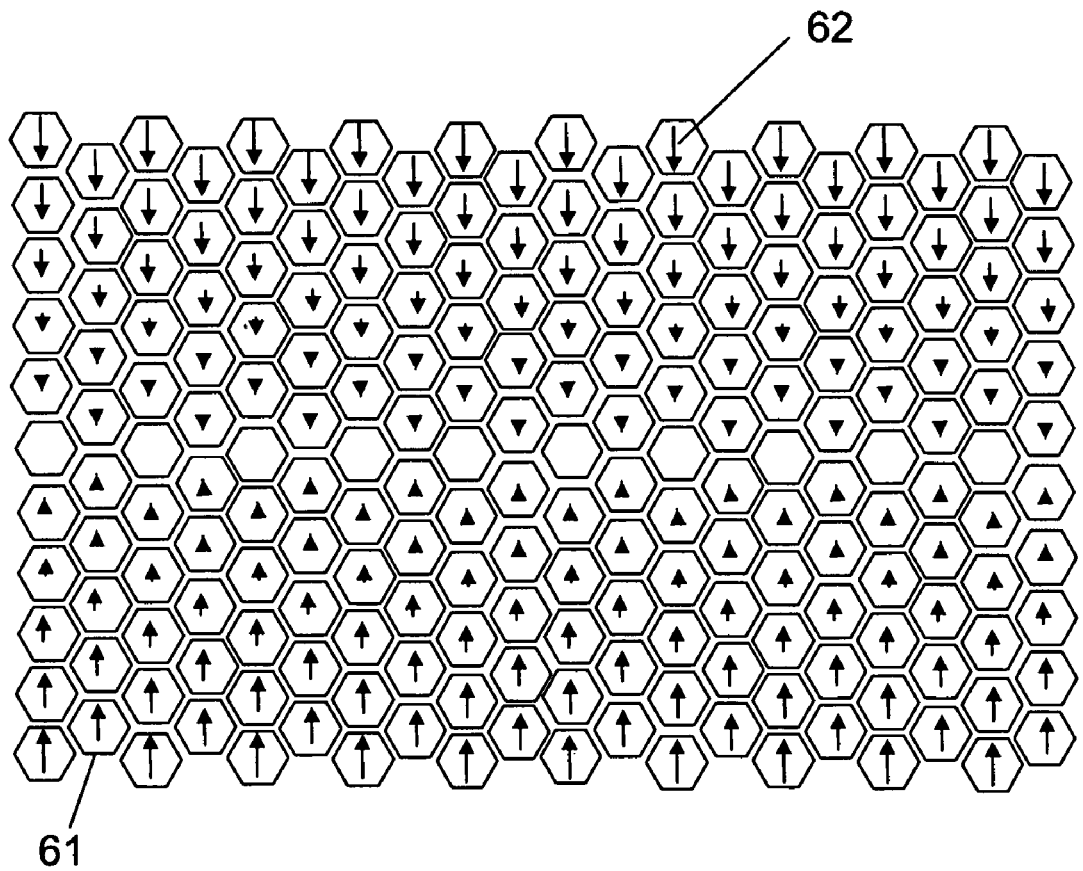
FIG. 6 is a schematic diagram showing the cylindrical lens comprising hexagonal micromirrors.
Figure 7:
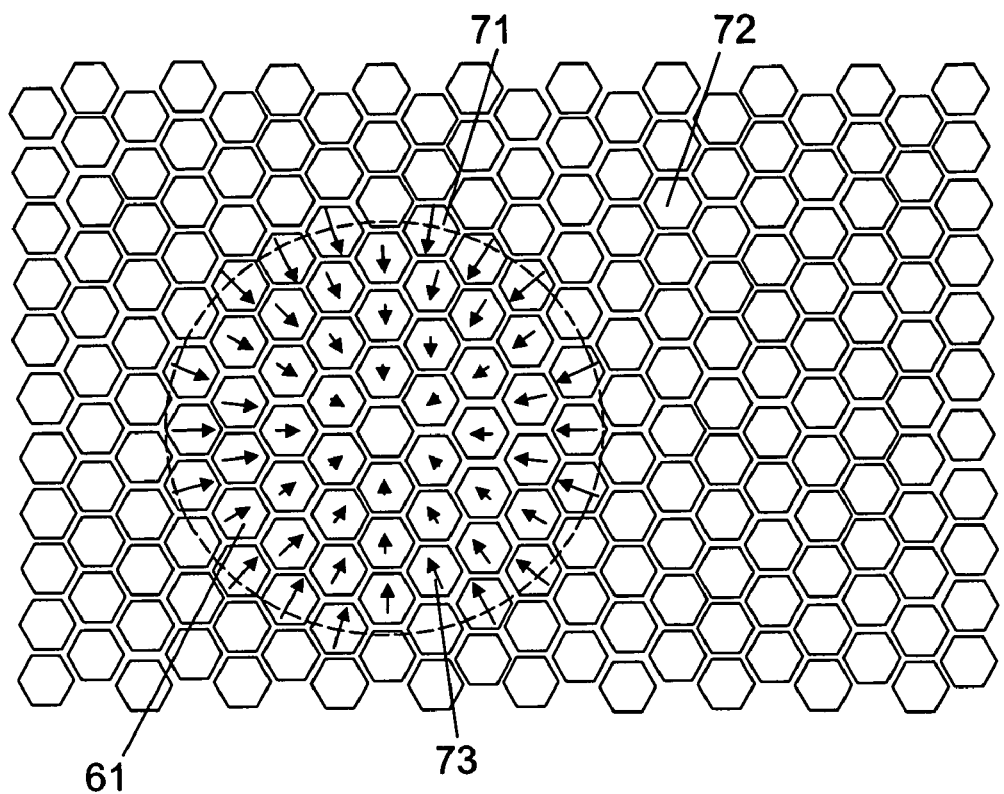
FIG. 7 is a schematic diagram showing the circular lens comprising hexagonal micromirrors.
Figure 8:
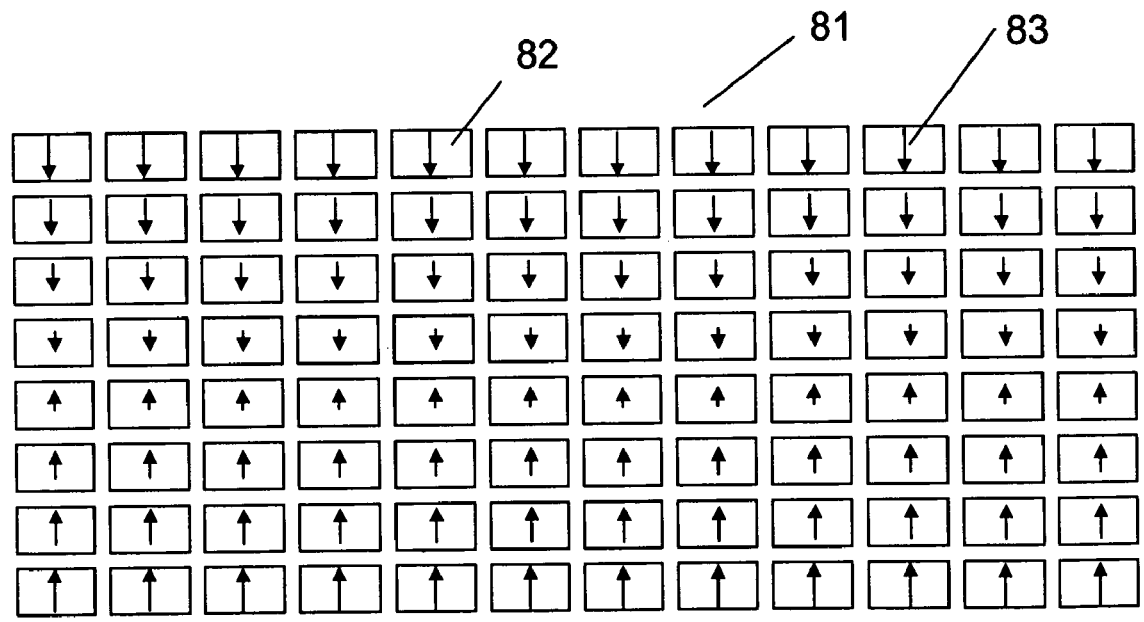
FIG. 8 is a schematic diagram showing the cylindrical lens comprising rectangular micromirrors.
Figure 9:
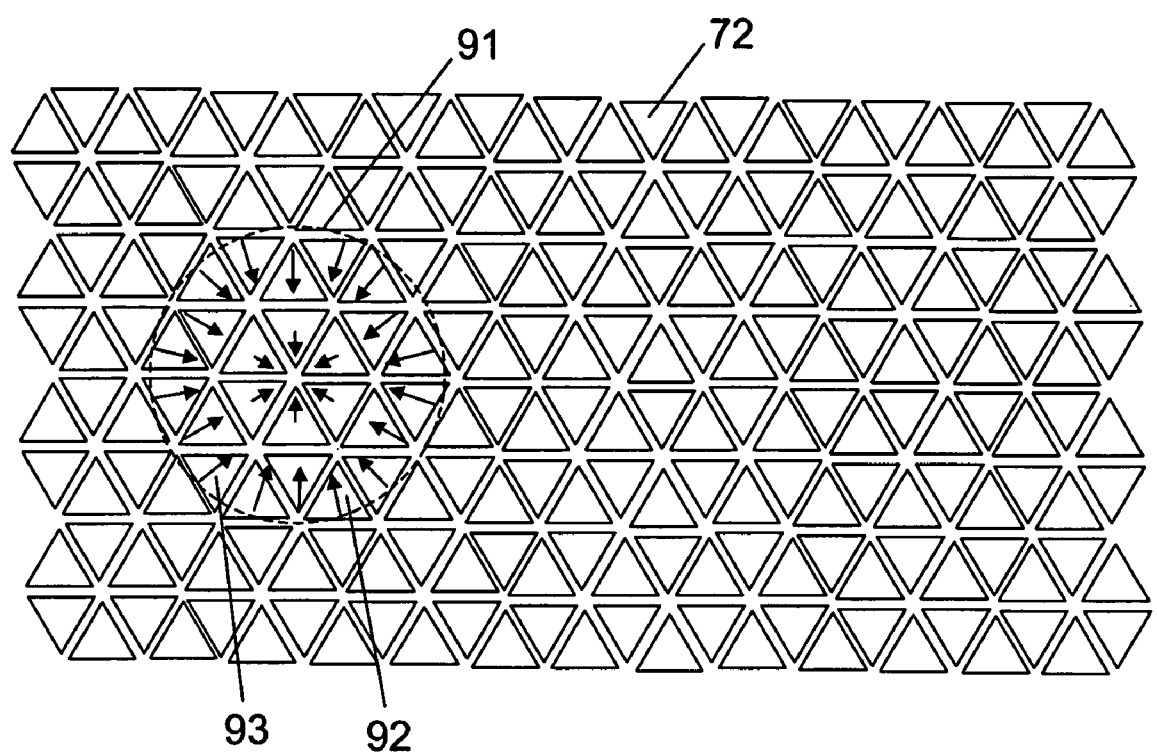
FIG. 9 is a schematic diagram showing the circular lens comprising triangular micromirrors.

In FIGS. 6–11, the rotational amount of the micromirror is represented by lengths of arrows 62, 73, 83, 93, 102, 112, respectively and the rotational direction of the micromirror is represented by directions of arrows 62, 73, 83, 93, 102, 112, respectively. FIG. 6 shows a variable focal length cylindrical lens comprising hexagonal micromirrors 61. FIG. 7 shows a variable focal length circular lens 71 comprising hexagonal micromirrors 61. Shape, position and size of the variable focal length circular lens 71 can be changed by independent control of micromirrors 61 with two rotations and one translation. Even though FIGS. 6, 7 show hexagonal micromirrors 61, fan shape, rectangle, square, and triangle micromirrors array can be used. An array comprising fan shape micromirrors is appropriate to an axisymmetric lens. FIG. 8 shows a variable focal length cylindrical lens 81 comprising rectangular micromirrors 82. An array comprising square or rectangle micromirrors 82 is appropriate to a symmetric lens about one axis of in-plane such as cylindrical lens 81. FIG. 9 shows a variable focal length circular lens 91 comprising triangular micromirrors 92. An array comprising triangular micromirrors 92 is appropriate to a lens with arbitrary shape and/or size lens like an array comprising hexagonal micromirrors.

Figure 10:
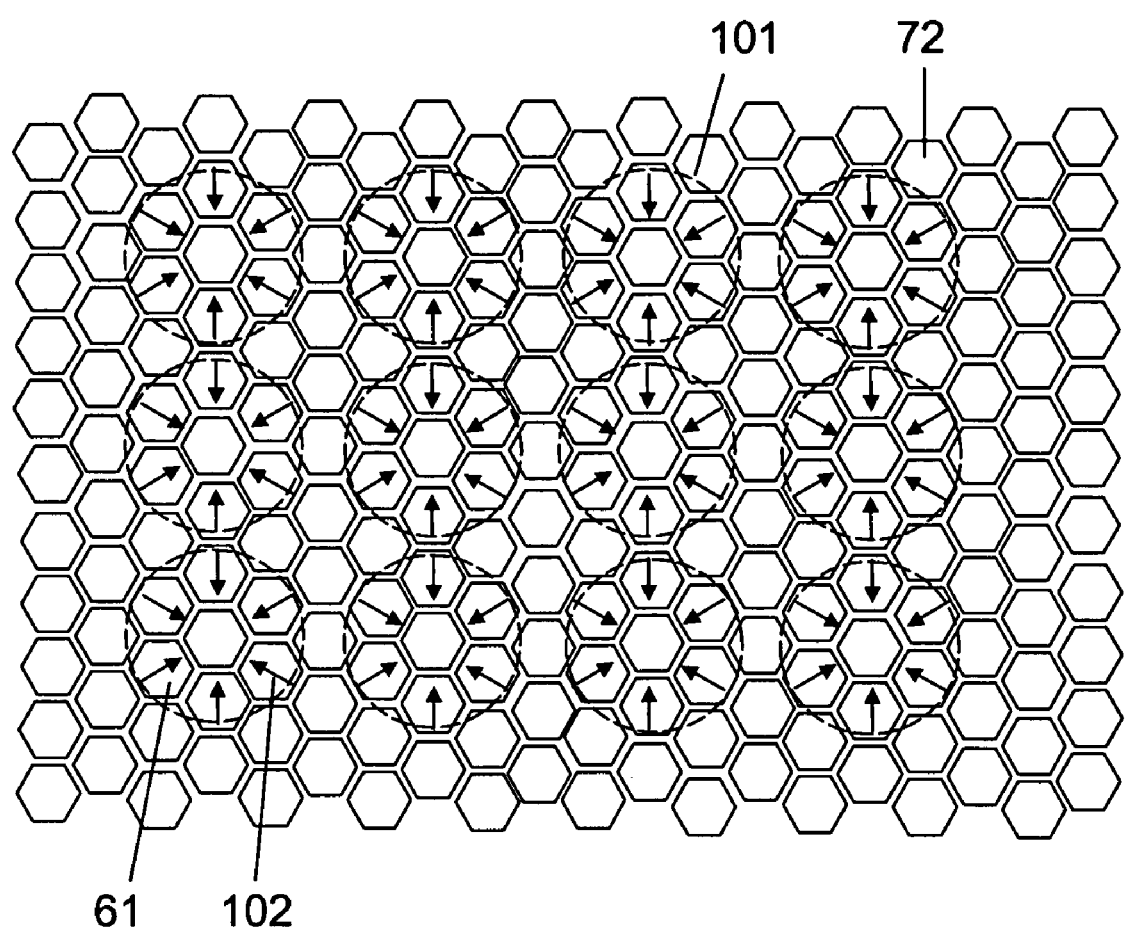
FIG. 10 is a schematic diagram showing the array of micromirror array lenses comprising hexagonal micromirrors.
Figure 11:
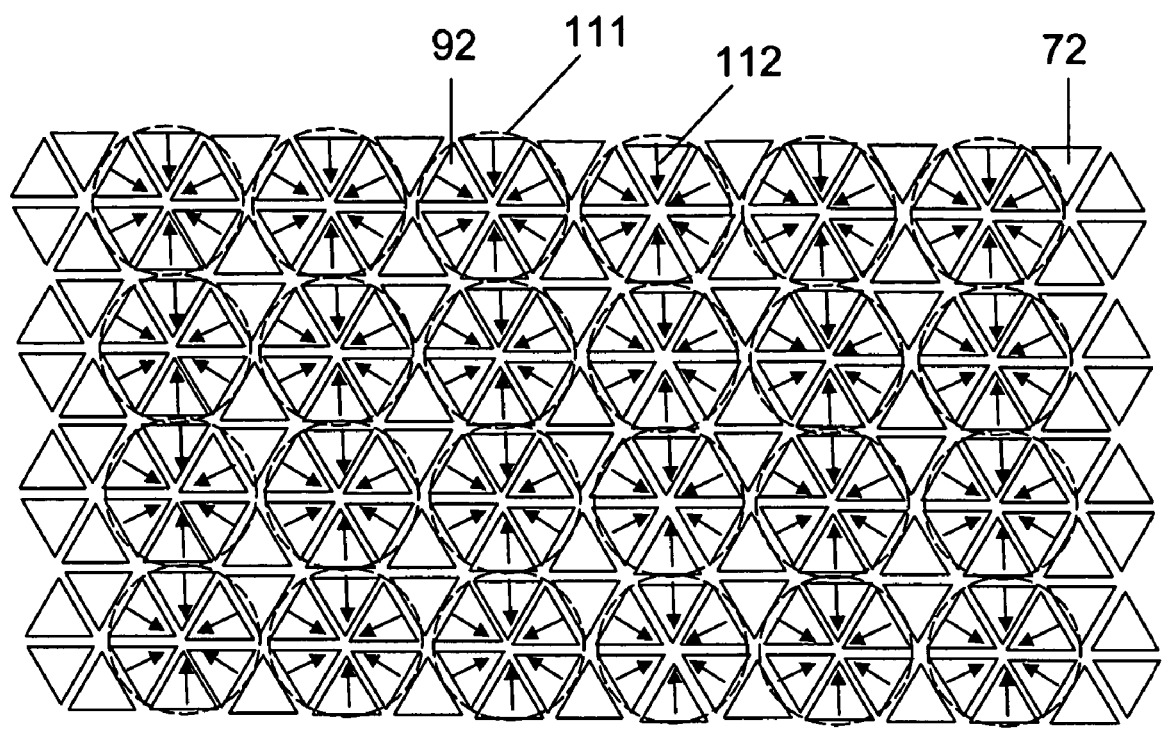
FIG. 11 is a schematic diagram showing the array of micromirror array lenses comprising triangular micromirrors.

FIG. 10 shows an array of the variable focal length lens 101 comprising hexagonal micromirrors 61. FIG. 11 shows an array of the variable focal length lens 111 comprising triangular micromirrors 61. In FIGS. 7, 9, 10 and 11, micromirrors 72 which are not elements of the lens or lenses are controlled to make lights reflected by the micromirrors 72 not have influence on imaging or focusing.

The micromirror array lens is an adaptive optical component because the phase of light can be changed by controlling the translations 54 and/or rotations 52, 53 of micromirrors independently. Adaptive optical micromirror array lens requires two-dimensional arrays of individually addressable micromirrors. To achieve this, it is necessary to combine the micromirrors with on-chip electronics. In order to do this, wafer-level integration of micromirrors with the microelectronics circuits is necessary.

The micromirror array lens can correct the phase errors since an adaptive optical component can correct the phase errors of light due to the medium between the object and its image and/or corrects the defects of a lens system that cause its image to deviate from the rules of paraxial imagery. For example, the micromirror array lens can correct the phase error due to optical tilt by adjusting the translations 54 and/or rotations 52, 53 of micromirrors.

The same phase condition satisfied by the micromirror array lens contains an assumption of monochromatic light. Therefore, to get a color image, the micromirror array lens is controlled to satisfy the same phase condition for each wavelength of Red, Green, and Blue (RGB), respectively, and the imaging system can use bandpass filters to make monochromatic lights with wavelengths of Red, Green, and Blue (RGB).

If a color photoelectric sensor is used as an imaging sensor in the imaging system using a micromirror array lens, a color image can be obtained by processing electrical signals from Red, Green, and Blue (RGB) imaging sensors with or without bandpass filters, which should be synchronized with the control of micromirror array lens. To image Red light scattered from an object, the micromirror array lens is controlled to satisfy the phase condition for Red light. During the operation, Red, Green, and Blue imaging sensors measure the intensity of each Red, Green, and Blue light scattered from an object. Among them, only the intensity of Red light is stored as image data because only Red light is imaged properly. To image each Green or Blue light, the micromirror array lens and each imaging sensor works in the same manner as the process for the Red light. Therefore, the micromirror array lens is synchronized with Red, Green, and Blue imaging sensors. Alternatively, the same phase condition for a color image is satisfied by using the least common multiple of wavelengths of Red, Green, and Blue lights as effective wavelength for the phase condition. In this case, the micromirror array lens is not necessary to be controlled to satisfy the phase condition for each Red, Green, and Blue light individually. Instead, the phase condition for the least common multiple of the wavelengths should be satisfied.

For the simpler control, the translation of each micromirror is only controlled to satisfy the phase condition for one light among Red, Green, and Blue lights or is not controlled to satisfy the phase condition for any light of Red, Green, and Blue lights. Even though the micromirror array lens is not controlled to satisfy the phase condition for all wavelengths, still the lens can be used as a variable focal length lens with low quality.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. An array of micromirror array lenses, wherein each of the micromirror array lenses comprises a plurality of micromirrors with two degrees of freedom rotation and one degree of freedom translation, wherein each micromirror is independently controlled to satisfy a same phase condition and a converging condition and change the focal length of the micromirror array lens.

2. The lens array of claim 1, wherein control circuitry is constructed under the micromirrors by using microelectronics fabrication technologies.

3. The lens array of claim 1, wherein the reflective surface of the micromirror is substantially flat.

4. The lens array of claim 1, wherein the reflective surface of the micromirror has a curvature.

5. The lens array of claim 4, wherein the curvatures of the micromirrors are controlled.

6. The lens array of claim 5, wherein the curvatures of the micromirrors are controlled by electrothermal force.

7. The lens array of claim 5, wherein the curvatures of the micromirrors are controlled by electrostatic force.

8. The lens array of claim 1, wherein the micromirror has a fan shape.

9. The lens array of claim 1, wherein the micromirror has a hexagonal shape.

10. The lens array of claim 1, wherein the micromirror has a rectangular shape.

11. The lens array of claim 1, wherein the micromirror has a square shape.

12. The lens array of claim 1, wherein the micromirror has a triangle shape.

13. The lens array of claim 1, wherein the micromirrors are controlled to change the focal length of each lens of the lens array.

14. The lens array of claim 1, wherein all of the micromirrors are arranged in a flat plane.

15. The lens array of claim 1, wherein the micromirrors are arranged to form one or more concentric circles to form a lens.

16. The lens array of claim 15, wherein the micromirrors on each of the concentric circles are controlled by one or more electrodes corresponding to the concentric circle.

17. The lens array of claim 1, wherein the micromirrors are actuated by electrostatic force.

18. The lens array of claim 1, wherein the micromirrors are actuated by electromagnetic force.

19. The lens array of claim 1, wherein the micromirrors are actuated by electrostatic force and electromagnetic force.

20. The lens array of claim 1, wherein a surface material of the micromirror is the one with high reflectivity.

21. The lens array of claim 1, wherein the surface material of the micromirror is metal.

22. The lens array of claim 1, wherein a mechanical structure upholding the micromirrors and actuating components are located under the micromirrors.

23. The lens array of claim 1, wherein the lens is an adaptive optical component, wherein the lens compensates for phase errors of light due to the medium between an object and its image.

24. The lens array of claim 1, wherein the lens is an adaptive optical component, wherein the lens corrects aberrations.

25. The lens array of claim 1, wherein the lens is an adaptive optical component, wherein the lens corrects the defects of an imaging system that cause the image to deviate from the rules of paraxial imagery.

26. The lens array of claim 1, wherein the lens is an adaptive optical component, wherein an object which does not lie on the optical axis can be imaged by the lens without macroscopic mechanical movement.

27. The lens array of claim 1, wherein the lens is controlled to satisfy the same phase condition for each wavelength of Red, Green, and Blue (RGB), respectively, to get a color image.

28. The lens array of claim 1, wherein the lens is controlled to satisfy the same phase condition for one wavelength among Red, Green, and Blue (RGB) to get a color image.

29. The lens array of claim 1, wherein the same phase condition for color imaging is satisfied by using a least common multiple of wavelengths of Red, Green, and Blue lights as an effective wavelength for the same phase condition.

30. The lens array of claim 1, wherein the micromirror is not controlled to satisfy the same phase condition for color imaging.

31. The lens of claim 1, wherein an optical axis of the lens can be changed by controlling micromirrors.

32. The lens of claim 1, wherein the size of the lens can be changed by controlling micromirrors.

33. The lens of claim 1, wherein the number of lenses of the lens array can be changed by controlling micromirrors.

* * * * *